(12) United States Patent
Mollmann et al.

(10) Patent No.: US 8,167,531 B2
(45) Date of Patent: May 1, 2012

(54) METHOD AND APPARATUS FOR SUPPORTING ROTOR ASSEMBLIES DURING UNBALANCES

(75) Inventors: Daniel E. Mollmann, Cincinnati, OH (US); Steven A. Ross, Cincinnati, OH (US); Richard Wesling, Cincinnati, OH (US); Thomas Edward Agin, Cincinnati, OH (US); Charles Orkiszewski, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 983 days.

(21) Appl. No.: 12/122,282

(22) Filed: May 16, 2008

(65) Prior Publication Data
US 2009/0285674 A1 Nov. 19, 2009

(51) Int. Cl.
*F04D 27/02* (2006.01)
(52) U.S. Cl. ............. 415/1; 415/9; 415/141; 415/124.2; 416/2
(58) Field of Classification Search .............. 415/9, 141, 415/216.1, 229, 124.2, 133, 1; 416/2, 145, 416/124.2, 133
See application file for complete search history.

(56) References Cited

U.S. PATENT DOCUMENTS

| 4,375,906 | A | 3/1983 | Roberts et al. |
| 5,433,584 | A | 7/1995 | Amin et al. |
| 5,791,789 | A | 8/1998 | Van Duyn et al. |
| 6,082,959 | A * | 7/2000 | Van Duyn .......................... 415/9 |
| 6,152,604 | A | 11/2000 | Ostling et al. |
| 6,155,788 | A | 12/2000 | Beckford et al. |
| 6,331,078 | B1 | 12/2001 | Van Duyn |
| 6,413,046 | B1 | 7/2002 | Penn et al. |
| 6,439,772 | B1 | 8/2002 | Ommundson et al. |
| 6,443,698 | B1 | 9/2002 | Corattiyil et al. |
| 6,447,248 | B1 | 9/2002 | Kastl et al. |
| 6,491,497 | B1 * | 12/2002 | Allmon et al. ................. 416/174 |
| 6,619,908 | B2 | 9/2003 | Bruno et al. |
| 6,783,319 | B2 * | 8/2004 | Doerflein et al. ................. 415/1 |
| 6,799,416 | B2 | 10/2004 | Plona et al. |
| 7,342,331 | B2 | 3/2008 | Down et al. |
| 7,360,986 | B2 | 4/2008 | Hugonie et al. |

* cited by examiner

*Primary Examiner* — Edward Look
*Assistant Examiner* — Adam W Brown
(74) *Attorney, Agent, or Firm* — David J. Clement, Esq.; Armstrong Teasdale LLP

(57) ABSTRACT

A method and apparatus for reducing dynamic loading of a gas turbine engine is provided. The gas turbine engine includes a rotor shaft assembly including a rotor shaft, a bearing assembly, a mounting race, and a support frame, the mounting race including a spherical surface. The method includes supporting the rotor shaft on the gas turbine engine support frame with the bearing assembly, the rotor shaft including a yield portion configured to permit bending of the rotor shaft during an imbalance operation.

16 Claims, 2 Drawing Sheets

METHOD AND APPARATUS FOR SUPPORTING ROTOR ASSEMBLIES DURING UNBALANCES

BACKGROUND OF THE INVENTION

This application relates generally to gas turbine engine rotor assemblies and, more particularly, to load reduction assemblies for gas turbine engine rotor assemblies.

Gas turbine engines typically include a rotor assembly, a compressor, and a turbine. The rotor assembly includes a fan that includes an array of fan blades extending radially outward from a rotor shaft. The rotor shaft transfers power and rotary motion from the turbine to the compressor and the fan and is supported longitudinally with a plurality of bearing assemblies. Additionally, the rotor assembly has an axis of rotation that passes through a rotor assembly center of gravity. Known bearing assemblies include rolling elements and a paired race, wherein the rolling elements are supported within the paired race. To maintain rotor critical speed margin, the rotor assembly is typically supported on three bearing assemblies, one of which is a thrust bearing assembly and two which are roller bearing assemblies. The thrust bearing assembly supports the rotor shaft and minimizes axial and radial movement of the rotor shaft assembly. The remaining roller bearing assemblies support radial movement of the rotor shaft.

During operation of the engine, a fragment of a fan blade may become separated from the remainder of the blade. Accordingly, a substantial rotary unbalance load may be created within the damaged fan and carried substantially by the fan shaft bearings, the fan bearing supports, and the fan support frames.

To minimize the effects of potentially damaging abnormal imbalance loads, known engines include support components for the fan rotor support system that are sized to provide additional strength for the fan support system. However, increasing the strength of the support components undesirably increases an overall weight of the engine and decreases an overall efficiency of the engine when the engine is operated without substantial rotor imbalances.

Other known engines include a bearing support that includes a mechanically weakened section, or primary fuse, that decouples the fan rotor from the fan support system. During such events, the fan shaft seeks a new center of rotation that approximates that of its unbalanced center of gravity. This fuse section, in combination with a rotor clearance allowance, is referred to as a load reduction device, or LRD. The LRD reduces the rotating dynamic loads to the fan support system.

After the primary fuse fails, the pitching fan rotor often induces a large moment to a next closest bearing. The next closest bearing is known as the number two bearing position. The moment induced to the number two bearing induces high bending and stress loads to the fan rotor locally. To relieve the high bending stresses, the radial and pitching rotation stiffness of the number two bearing position are often softened or released to maintain a safe shutdown and subsequent windmill of the engine during the time it takes to land an aircraft. However, the forces are still large enough that withstanding these loads with acceptable stresses adds weight and cost to the engine/aircraft system.

BRIEF DESCRIPTION OF THE INVENTION

In one embodiment, a method for reducing dynamic loading of a gas turbine engine is provided. The gas turbine engine includes a rotor shaft assembly including a rotor shaft, a bearing assembly, a mounting race, and a support frame, the mounting race including a spherical surface. The method includes supporting the rotor shaft on the gas turbine engine support frame with the bearing assembly, the rotor shaft including a yield portion configured to permit yielding of the rotor shaft during an imbalance operation.

In another embodiment, rotor assembly for a gas turbine engine includes a rotor shaft comprising a recess and a yield portion defined between said recess and a forward bearing seat, a mounting race comprising an upstream side, a downstream side, and a spherical surface extending therebetween, a bearing assembly coupled to the mounting race to support the rotor shaft on a support frame, and a mechanical fuse coupled to said mounting race to secure said bearing assembly. The mechanical fuse is configured to fail during an imbalance condition of the rotor shaft, such failure causing the rotor shaft to operate above a vibratory bending mode frequency of the rotor shaft.

In yet another embodiment, a gas turbine engine assembly includes a rotor assembly for a fan wherein the rotor assembly includes a bearing assembly coupled to a support frame, a cone shaft coupled to the bearing assembly, and a rotor shaft comprising a yield portion coupled to said cone shaft through a mounting race. The mounting race includes an upstream side, a downstream side, and a spherical surface extending therebetween. The yield portion is configured to reduce an imbalance in the rotor shaft by yielding in response to torsional and moment loads generated in the rotor shaft.

BRIEF DESCRIPTION OF THE DRAWINGS

FIG. 1 is a schematic illustration of an exemplary engine assembly having a longitudinal axis; and FIG. 2 is a cross-sectional view of a rotor and bearing assembly that may be used with a gas turbine engine, such as engine assembly shown in FIG. 1.

DETAILED DESCRIPTION OF THE INVENTION

The following detailed description illustrates embodiments of the invention by way of example and not by way of limitation. It is contemplated that the invention has general application to rotatable machines such as but not limited to turbines and electrical machines in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
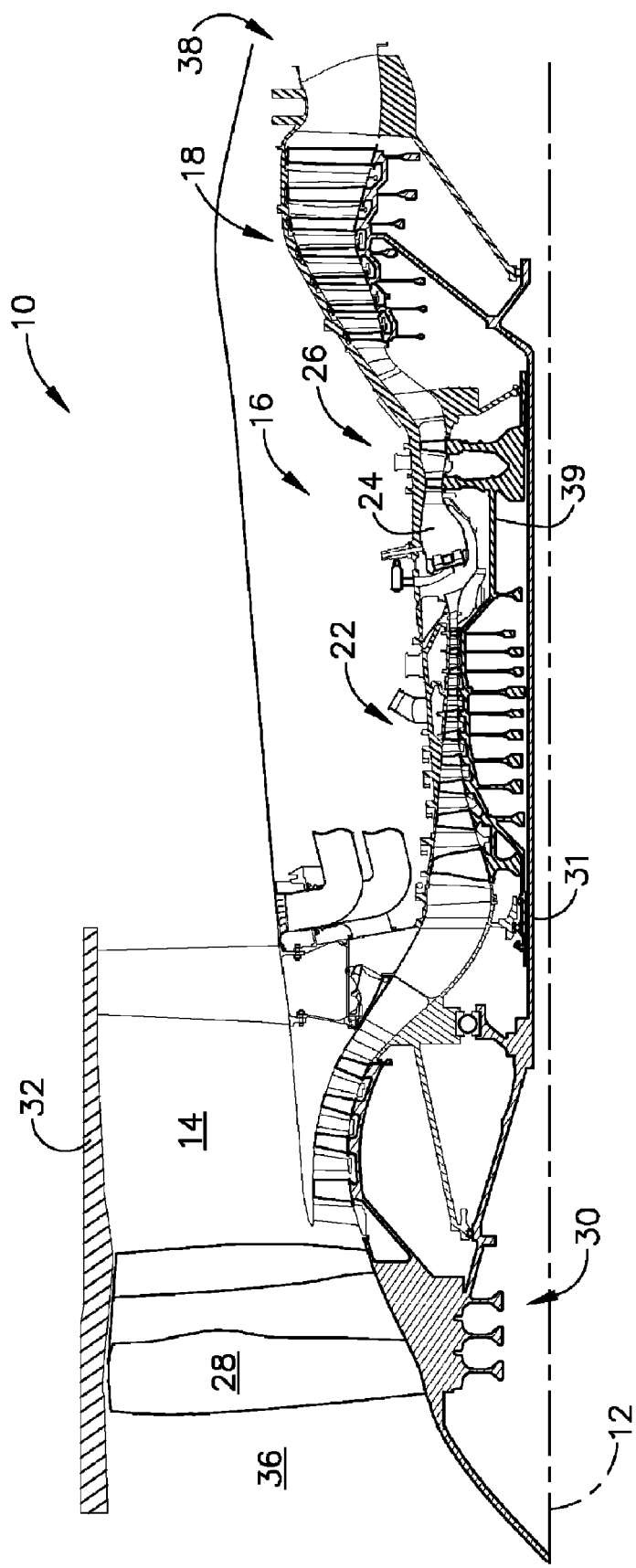
FIGS. 1-2 show exemplary embodiments of the method and apparatus described herein.

FIG. 1 is a schematic illustration of an exemplary engine assembly 10 having a longitudinal axis 12. Engine assembly 10 includes a fan assembly 14, a core gas turbine engine 16 that is disposed downstream from fan assembly 14, and a low-pressure turbine 18 that is disposed downstream from core gas turbine engine 16. Core gas turbine engine 16 includes a high-pressure compressor 22, a combustor 24, and a high-pressure turbine 26.

Fan assembly 14 includes a plurality of fan blades 28 that extend radially outward from a rotor disk 30 of a rotor 31, and a fan casing 32 that extends circumferentially about fan blades 28. Engine assembly 10 has an intake side 36 and an exhaust side 38. Compressor 22 and high-pressure turbine 26 are coupled together by a second drive shaft 39.

Figure 2:
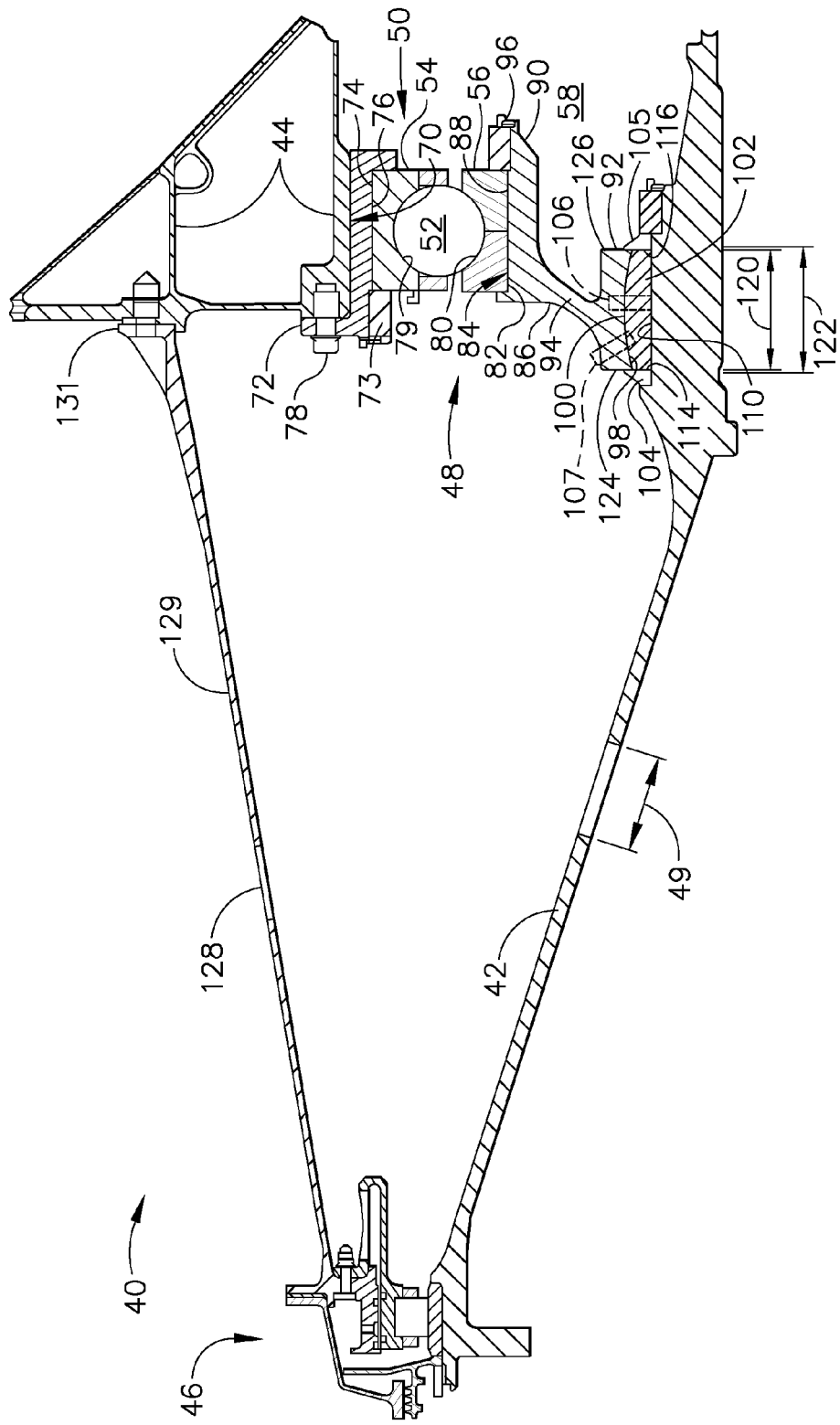

FIG. 2 is a cross-sectional view of a rotor and bearing assembly 40 that may be used with a gas turbine engine, such as engine assembly 10 shown in FIG. 1. In one embodiment, the gas turbine engine is a GEnx engine available from General Electric Company, Cincinnati, Ohio. Rotor and bearing assembly 40 includes rotor disk 30 (shown in FIG. 1) and a rotor shaft 42 which supports an array of fan blades 28 (shown in FIG. 1) that extend radially outward from rotor disk 30. Rotor shaft 42 is rotatably secured to a structural support frame 44 with longitudinally spaced bearing assemblies 46 and 48 that support rotor shaft 42 on support frame 44. In one embodiment, bearing assembly 48 is located in a number two bearing position, aft of number one bearing 46, and is a fan thrust bearing and bearing 46 is supported by a forward bearing support 129 coupled to support frame 44 through a forward bearing support flange 131.

Rotor shaft 42 includes a yield portion 49 configured to permit rotor shaft 42 to yield due to torsional and moment loads generated in rotor shaft 42 during for example, a blade-out or other imbalance condition. Yield portion 49 may include a radially thinner portion of rotor shaft 42 or may include a circumferential material treatment that facilitates permitting rotor shaft 42 to yield at yield portion 49. In another embodiment, rotor shaft 42 does not include yield portion 49, but rather most, if not all, of rotor shaft 42 is configured to yield when subjected to predetermined torsional and/or moment loads. More specifically, in such an embodiment, shaft 42 may be configured to substantially simultaneously yield in bending, as distributed substantially over a full length of shaft 42, when subjected to predetermined torsional and/or moment load.

In an exemplary embodiment, each bearing assembly 48 includes a paired race 50 and a rolling element 52. Paired race 50 includes an outer race 54 and an inner race 56 radially inward from outer race 54. Rolling element 52 is disposed between inner race 56 and outer race 54. Bearing assembly 48 is enclosed within a sealed annular compartment 58 radially bounded by rotor shaft 42 and support frame 44. Rolling element 52 may be a plurality of elements including, but not limited to, a ball bearing or a roller bearing.

Support frame 44 includes a recess 70 defined within a bearing support 72 and sized to receive outer race 54. Outer race 54 is secured within bearing support 72 with a spanner nut 73 such that an outer surface 74 of outer race 54 is adjacent an inner surface 76 of bearing support 72. In an alternative embodiment, outer race 54 is secured within support frame recess 70 with a spanner nut 73. A fastener 78 secures bearing support 72 and outer race 54 within recess 70. In one embodiment, bearing support 72 is radially flexible. A face 79 of outer race 54 is contoured and sized to receive rolling element 52 in rollable contact.

Inner race 56 includes a face 80 and an inner surface 82. Inner race face 80 is contoured and sized to receive rolling element 52 in rollable contact. Inner race 56 is secured within a recess 84 within a cone shaft 86 such that inner race inner surface 82 is adjacent an outer surface 88 of recess 84. In one embodiment, inner race 56 is split race mating and rolling element 52 is a ball bearing. In another embodiment, outer race 54 is split race mating and rolling element 52 is a ball bearing.

Cone shaft 86 extends radially outward from fan rotor shaft 42 and includes an outer portion 90, an inner portion 92, and a body 94 extending therebetween. Recess 84 extends within cone shaft outer portion 90 and is sized to receive inner race 56. A bearing spanner nut 96 secures inner race 56 within cone shaft recess 84. Body 94 provides axial thrust and radial support to bearing assembly 48. Cone shaft inner portion 92 includes an inner surface 98. Inner surface 98 is contoured to fit in slidable contact against a face 100 of a mounting race 102.

Mounting race 102 reduces static loads to rotor and bearing assembly 40 and dynamic loads to support frame 44. Mounting race 102 is secured to fan rotor shaft 42 with a pair of retainers 104 and 105. In another embodiment, mounting race 102 is secured in position with at least one shear pin (not shown), such as is described in U.S. Pat. No. 6,783,319. In one embodiment, retainers 104 and 105 are spring clamps and can provide axial preload to shaft inner portion 92. Accordingly, mounting race 102 rotates simultaneously with rotor shaft 42. Fan rotor shaft 42 includes a recess 110 sized to receive mounting race 102 and retainers 104 and 105 such that a gap (not shown) exists between an inner face 114 of retainer 104 and an inner face 116 of retainer 105. Mounting race face 100 is a spherical surface. In one embodiment, mounting race face 100 is radially thin and is ovalized elastically to assemble to mounting race 102. In an alternative embodiment, recess 110 is sized to receive mounting race 102 and cone shaft 86 is secured to mounting race 102 using one or more circumferentially spaced mechanical fuses 106 and/or 107.

In the exemplary embodiment, mounting race 102 includes a width 120 that is substantially equal to a width 122 of cone shaft inner portion 92 such that when assembled, an upstream side 124 of cone shaft inner portion 92 is substantially co-planar with retainer inner face 114, and a downstream side 126 of cone shaft inner portion 92 is substantially coplanar with retainer inner face 116. An axial preload exists to limit rotation of cone shaft inner portion 92 with respect to mounting race 102, when cone shaft inner portion 92 is not mounted substantially co-planer with mounting race 102.

During assembly of rotor and bearing assembly 40, bearing assembly 48 and mounting race 102 may be pre-assembled on fan rotor shaft 42. Pre-assembling bearing assembly 48 and mounting race 102 to rotor shaft 42 minimizes assembly damage and bearing contamination during main engine assembly. Furthermore, as mounting race 102 is secured to fan rotor shaft 42 with retainers 104 and 105, the gap between respective retainers 104 and 105, and mounting race 102 is eliminated. The gap is sized to permit retainers 104 and 105 to provide a controlled amount of axial preload to mounting race 102. In addition, retainers 104 and 105 maintain mounting race 102 substantially square with relation to shaft 42 during assembly and normal operation.

During operation of engine 10, an unbalance of engine 10 may cause high radial forces to be applied to fan assembly 14 (shown in FIG. 1) and a forward most engine bearing. The high radial forces may cause a primary fuse portion 128 to fail at an engine number one bearing position. The primary fuse failure allows fan assembly 14 to rotate about a new axis of rotation, thus changing a center of gravity of rotor shaft 42 and inducing bending loads on rotor shaft 42 that induce a moment load on bearing assembly 48 at the number two engine bearing position. Retainers 104 and 105 are fabricated from a material that fails at a pre-determined moment load applied to rotor shaft 42. After retainer 104 and 105 fails, mounting race spherical face 100 allows shaft 42 to pitch such that a shaft center of rotation (not shown) approaches that of the new rotor center of gravity. In an alternative embodiment, fuses 106 and 107 are fabricated from a material that fails at a pre-determined moment load applied to rotor shaft 42. After fuses 106 or 107 fail, mounting race spherical face 100 allows shaft 42 to pitch such that a shaft center of rotation (not shown) approaches that of the new rotor center of gravity. Rotor shaft 42 yields at yield portion 49 due to torsional and moment loads. The failure of primary fuse portion 128, retainers 104 and 105, and/or fuses 106 or 107 causes rotor shaft 42 to be operating above the frequency of its vibratory bending mode. Thus, the deflection is more than 90° from the unbalance (approaching 180°), and rotor shaft 42 is bent towards the light side, for example, towards the direction of the imbalance. When it yields due to the torque and bending stress, it yields towards the light side, effectively reducing the unbalance and reducing the fan bladeout loads on the system.

Because a moment restraint is released, rotor and bearing assembly 40 is permitted to approach the rotor center of gravity and dynamic loads induced to support frame 44 are reduced. Furthermore, because spherical mounting face 100 and rolling element 52 keep rotor shaft 42 positioned axially with respect to support frame 44, turbine clashing between rotor and bearing assembly 40 and a stator assembly (not shown) is substantially eliminated.

The above-described rotor assembly is cost-effective and highly reliable. The rotor assembly includes a bearing assembly that fails when a pre-determined moment load is applied to the bearing assembly. During operation, when the bearing assembly fails, bending loads transmitted to the rotor assembly are reduced when the rotor shaft yields at a yield portion towards the imbalance. As a result, the rotor assembly does not transmit potentially damaging dynamic loads to the structural frame supporting the rotor shaft because the center of rotation approaches the rotor shaft center of gravity. Furthermore, because the bearing supporting the unbalanced rotor assembly is maintained, the rotor assembly maintains rotational frequency above a fan windmilling frequency.

While the disclosure has been described in terms of various specific embodiments, it will be recognized that the disclosure can be practiced with modification within the spirit and scope of the claims.

What is claimed is:

1. A method for reducing dynamic loading of a gas turbine engine, the engine including a rotor shaft assembly including a fan, a rotor shaft, a bearing assembly, a mounting race including a spherical surface, and a support frame including a forward bearing support comprising a radially thinner annular portion defining a fuse, said method comprising:
    supporting the rotor shaft on the gas turbine engine support frame with the bearing assembly, the rotor shaft configured to permit yielding of the rotor shaft during an imbalance operation; and
    failing the fuse in shear wrinkling circumferentially around the fuse following an imbalance load transfer between the fan and the support frame.

2. The method in accordance with claim 1, further comprising coupling the mounting race to the bearing assembly such that a cone shaft extends between the bearing assembly and the mounting race.

3. The method in accordance with claim 1, further comprising reducing an imbalance in the rotor shaft assembly by permitting the rotor shaft to yield in a direction opposite the imbalance.

4. The method in accordance with claim 1, further comprising reducing an imbalance in the rotor shaft assembly by permitting the rotor shaft to yield due to torsional and moment loads generated in the rotor shaft by the imbalance.

5. The method in accordance with claim 1, further comprising coupling the mounting race to the bearing assembly by:
    mounting the mounting race to the rotor shaft such that the mounting race is between the bearing assembly and the rotor shaft; and
    securing the position of the mounting race to the rotor shaft with a mechanical fuse that fails at a predetermined moment load.

6. A rotor assembly for a gas turbine engine, said rotor assembly comprising:
    a rotor shaft comprising a recess and a yield portion defined between said recess and a forward bearing seat, said forward bearing seat configured to engage a forward bearing supported by the support frame through a forward bearing support, said forward bearing support comprising a radially thinner annular portion defining a fuse, said fuse configured to fail in shear wrinkling circumferentially around said fuse following an imbalance load transfer between the fan and the support frame;
    a mounting race comprising an upstream side, a downstream side, and a spherical surface extending therebetween;
    a bearing assembly coupled to the mounting race to support the rotor shaft on a support frame; and
    a mechanical fuse coupled to said mounting race to secure said bearing assembly,
    wherein said mechanical fuse is configured to fail during an imbalance condition of the rotor shaft, such failure causing the rotor shaft to operate above a vibratory bending mode frequency of the rotor shaft.

7. The rotor assembly in accordance with claim 6, wherein operation of the rotor shaft above a vibratory bending mode frequency of the rotor shaft causes the rotor shaft to yield in a direction away from the imbalance.

8. The rotor assembly in accordance with claim 6, wherein failure of the mechanical fuse generates torsional and moment loads in the rotor shaft that cause the rotor shaft to yield in a direction away from the imbalance.

9. The rotor assembly in accordance with claim 6, wherein the rotor shaft yields such that unbalance is reduced.

10. The rotor assembly in accordance with claim 6, wherein said rotor shaft comprises a radially thinner annular portion that permits the rotor shaft to yield when the torsional and moment loads in the rotor shaft exceed a predetermined limit.

11. The rotor assembly in accordance with claim 6, further comprising a cone shaft extending between said mounting race and said bearing, said cone shaft coupled to said mounting race using said mechanical fuse.

12. A gas turbine engine assembly that includes a rotor assembly for a fan, said rotor assembly comprising:
    a bearing assembly coupled to a support frame;
    a cone shaft coupled to said bearing assembly;
    a rotor shaft comprising at least a yield portion coupled to said cone shaft through a mounting race, said mounting race comprising an upstream side, a downstream side, and a spherical surface extending therebetween, said yield portion configured to reduce an imbalance in the rotor shaft by yielding in response to torsional and moment loads generated in the rotor shaft; and
    a forward bearing seat configured to engage a forward bearing supported by the support frame through a forward bearing support, said forward bearing support comprising a radially thinner annular portion defining a fuse, said fuse configured to fail in shear wrinkling circumferentially around said fuse following an imbalance load transfer between the fan and the support frame.

13. The gas turbine engine assembly in accordance with claim 12, wherein said yield portion permits said rotor shaft to yield in a direction away from the imbalance.

14. The gas turbine engine assembly in accordance with claim 12, further comprising a mechanical fuse securing said cone shaft to said mounting race, said mechanical fuse configured to fail at a predetermined moment load.

15. The gas turbine engine assembly in accordance with claim 12, further comprising a mechanical fuse securing said cone shaft to said mounting race, said mechanical fuse configured to fail prior to said yield portion yielding.

16. The gas turbine engine assembly in accordance with claim 12, wherein said rotor shaft comprises a radially thinner annular portion that permits the rotor shaft to yield when the torsional and moment loads in the rotor shaft exceed a predetermined limit.

* * * * *